Sept. 23, 1930.  F. B. THOLE ET AL  1,776,340

PURIFICATION OF LIQUID HYDROCARBONS

Filed Nov. 6, 1924

Inventors
F. B. Thole
S. J. Card
by
W. E. Evans
Attorney.

Patented Sept. 23, 1930

1,776,340

UNITED STATES PATENT OFFICE

FERDINAND BERNARD THOLE AND STEPHEN THOMAS CARD, OF SUNBURY-ON-THAMES, ENGLAND, ASSIGNORS TO ANGLO-PERSIAN OIL COMPANY, LIMITED, OF LONDON, ENGLAND

PURIFICATION OF LIQUID HYDROCARBONS

Application filed November 6, 1924, Serial No. 748,267, and in Great Britain January 11, 1924.

This invention relates to the treatment of liquid hydrocarbons for the removal therefrom of sulphur compounds such as organic sulphides, poly-sulphides and hydro-sulphides they may contain.

The invention specifically relates to the use of hypochlorite solutions such as sodium or calcium hypochlorite for the purpose.

In the use of such solutions the sulphur compounds contained in the oil are oxidized and the bodies produced readily pass into and are removed with the lye, but it has been found necessary to employ a slight excess of free alkali for the principal purpose of inhibiting chlorination of the hydrocarbons and of stabilizing the solution so as to inhibit decomposition during storage. This was rendered necessary owing to the instability of such hypochlorite solutions without such a slight excess of free alkali The present invention is based upon the discovery that the reaction may be accelerated and the hypochlorite solution rendered reactive by the reduction in the content of free alkali immediately before the use of the hypochlorite solution or during the treatment, whereby the solution is to a substantial extent de-stabilized but under such conditions that the destabilizer is uniformly distributed so that there may be no local excess of acid, particularly of strong acid, such as is very liable to occur if mineral acid is employed for this purpose and which is apt to lead to the spontaneous decomposition of the whole batch.

According to the invention carbon-dioxide is used and is admitted into the vessel in which the treatment is carried out through pipes advantageously mounted at the bottom of the vessel, means being provided or employed for stirring the liquids in the treatment to ensure the uniform distribution of the gas and to ensure the necessary intimate admixture of the hypochlorite solution with the oil, the carbon-dioxide being introduced in such quantity that the content of free caustic soda is reduced practically to zero; or instead of carbon-dioxide a solution of a metallic salt, which by reaction with the free alkali precipitates insoluble hydroxides, is employed such for example as ferrous sulphate, ferric sulphate, ferric chloride, manganese sulphate, magnesium sulphate and zinc sulphate. Such a salt is advantageously introduced into the solution of hypochlorite in the condition of a solution and is uniformly distributed therein, its effect being the same as the addition of carbon dioxide in that by reduction of the concentration of hydroxyl ions, the free alkali is destroyed.

As a practical application indicating the effect of the treatment, the following example may be given:

On 500 cc. of a sulphur-containing oil being stirred with 130 cc. of 0.382 N sodium hypochlorite containing 1.1 gm. caustic soda per litre, that is to say with an excess of caustic soda to render the solution of hypochlorite sufficiently stable to be stored, 34.5% of the hypochlorite was found to have been used up in ten minutes, whereas when the same treatment was carried out with the addition of .19 gms. of ferric sulphate, 79% of the hypochlorite was used up in the same period. It will be understood that such an amount of ferric sulphate consumed .116 gm. of free caustic soda, so that thus the free alkali content would have been reduced from .143 gm. to .027 gm. If the quantity of ferric sulphate added is sufficient to remove the last trace of free alkali under the conditions hereinbefore described, the activity of the hypochlorite is further increased.

The following example demonstrates the effect secured in the use of carbon dioxide.

500 cc. of a sulphur containing oil was stirred with 200 cc. of sodium hypochlorite (0.32 N) containing 0.7 gm. caustic soda per litre, and after ten minutes 33.7% of the hypochlorite was found to have been used up. Immediately thereupon sufficient carbon dioxide was passed in to remove the free caustic soda in the form of sodium bicarbonate, with the result that after a further five minutes agitation, 91% of the hypochlorite was used up.

For the introduction of the carbon dioxide (either as such or as flue gases) or another destabilizer into the hypochlorite no special plant is required. In the accompanying diagrammatic drawings are illustrated, by way of example, two forms of suitable apparatus.

Figure 1:
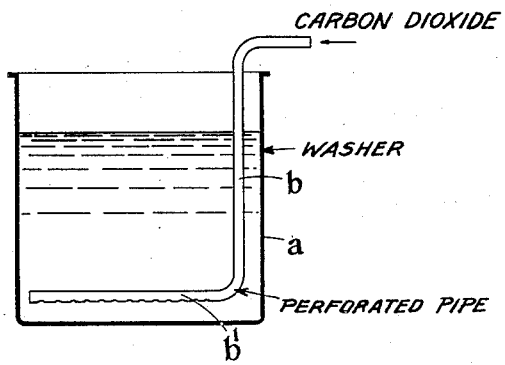
Figure 1 represents an apparatus suitable for the introduction of carbon dioxide into the hypochlorite.

As illustrated in Figure 1, the carbon dioxide may be passed into the hypochlorite solution contained within a suitable receptacle $a$ by a pipe $b$ a portion of which is adapted to lie adjacent the bottom of the receptacle as at $b^1$ and is perforated for the escape of gas into the solution and is closed at the end. The perforated pipe may be formed into a coil or be replaced by any suitable arrangement of perforated piping or other means for introducing the gas into the solution so that it may bubble through it.

Figure 2:
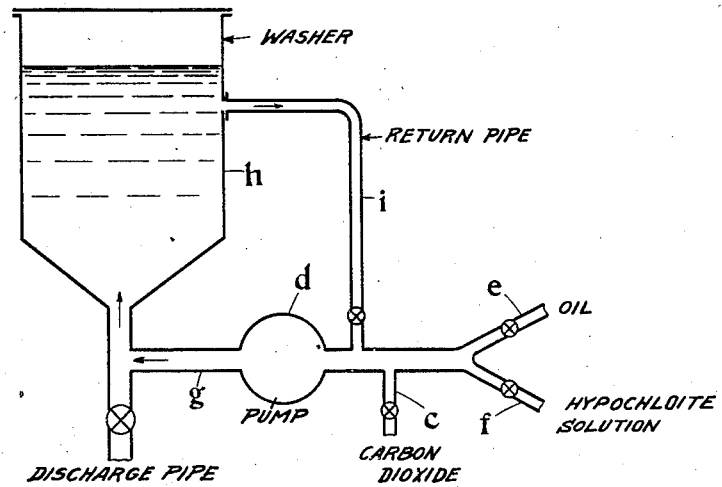
Figure 2 represents an apparatus suitable for the introduction of carbon dioxide or a solution of another destabilizer together with hypochlorite solution and the oil to be treated into a washer.

Again, as illustrated in Figure 2, the carbon dioxide or other destabilizer may be supplied by a conduit $c$ to a pump $d$ which serves to draw supplies of the oil to be treated and of the hypochlorite solution respectively from the conduits $e$ and $f$, the delivery outlet of the pump being connected by a conduit $g$ with a washer $h$ in which the reaction may be effected. The carbon dioxide or other destabilizer is thus churned up by the pump and brought into intimate contact with the hypochlorite solution. The suction inlet of the pump may also be adapted to permit the pump to draw upon the contents of the washer by way of a conduit $i$, and thus to maintain circulation and agitation of the said contents. The supplies of oil, hypochlorite solution and carbon dioxide or other destabilizer may be controlled by valves provided upon the respective supply conduits. Similarly, the carbon dioxide or other destabilizer may be introduced through a by-pass into a pump serving for the supply of hypochlorite solution or it may be introduced into the washer after the hypochlorite solution and the oil have been mixed therein. The procedure is the same whatever the destabilizer used and the solution of the destabilizer may be introduced in the same way as the carbon dioxide.

It is preferred that the amount of excess alkali be reduced during the treatment, but a part of the excess may be reduced immediately before the commencement of the treatment.

We claim:—

In a method of refining liquid hydrocarbons the steps of substantially de-stabilizing an aqueous solution of a hypochlorite containing a slight excess of free alkali by the addition into the solution of carbonic acid gas and washing the said liquid hydrocarbons with the said aqueous solution thus substantially de-stabilized, substantially as described.

FERDINAND BERNARD THOLE.
STEPHEN THOMAS CARD.